(12) United States Patent
Tanaka et al.

(10) Patent No.: US 6,181,724 B1
(45) Date of Patent: Jan. 30, 2001

(54) NARROW-BAND OSCILLATION EXCIMER LASER AND OPTICS THEREOF

(75) Inventors: Hirokazu Tanaka; Toru Igarashi, both of Oyama (JP)

(73) Assignee: Komatsu Ltd., Tokyo (JP)

( * ) Notice: Under 35 U.S.C. 154(b), the term of this patent shall be extended for 0 days.

(21) Appl. No.: 09/205,635

(22) Filed: Dec. 3, 1998

(30) Foreign Application Priority Data

Dec. 12, 1997 (JP) .................................................... 9-362755

(51) Int. Cl.[7] .............................. H01S 3/22; G02B 27/22
(52) U.S. Cl. .............................................. 372/57; 359/469
(58) Field of Search ............................. 372/57; 359/669, 359/469, 831–837

(56) References Cited

U.S. PATENT DOCUMENTS 4,759,616 * 7/1988 Marchant ............................... 359/669
5,835,520 * 11/1998 Das et al. .................................. 372/57

FOREIGN PATENT DOCUMENTS 3-214680   9/1991   (JP) .

* cited by examiner

*Primary Examiner*—Frank G Font
*Assistant Examiner*—Armando Rodriguez
(74) *Attorney, Agent, or Firm*—Sidley & Austin

(57) ABSTRACT

A narrow-band oscillation excimer laser has optics which are excellent in durability and light quality, wherein an optical component is a fluoride component (7), and wherein a cleavage plane (20) of the fluoride component (7) is at least substantially parallel with at least one of (a) an incidence side plane (23), for a laser beam (3) entering the fluoride component(7), and (b) an exit side plane (23a), for the laser beam (3) exiting from the fluoride component (7). The fluoride component (7) is positioned in the excimer laser so that the cleavage plane (20) of the fluoride component (7) is at least substantially perpendicular to a light path of the laser beam (3) passing through the inside of the fluoride component (7). A visible mark (27) indicates a direction of the cleavage plane (20).

20 Claims, 5 Drawing Sheets

F I G. 8 CONVENTIONAL ART
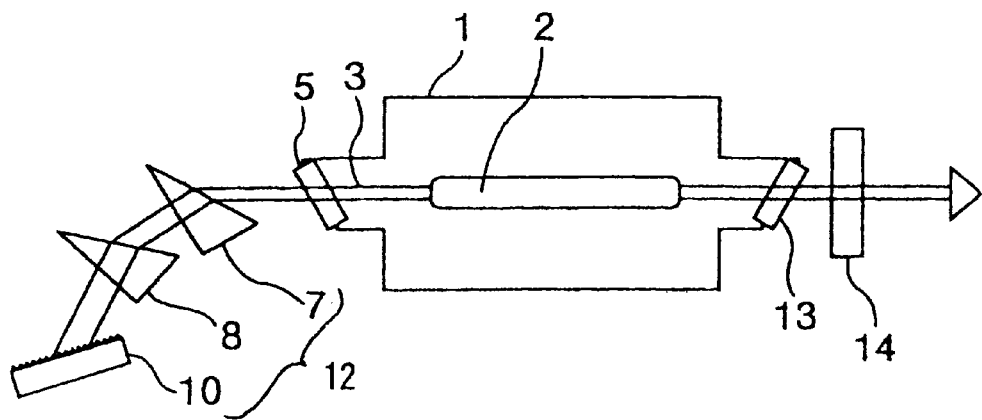
F I G. 9 CONVENTIONAL ART
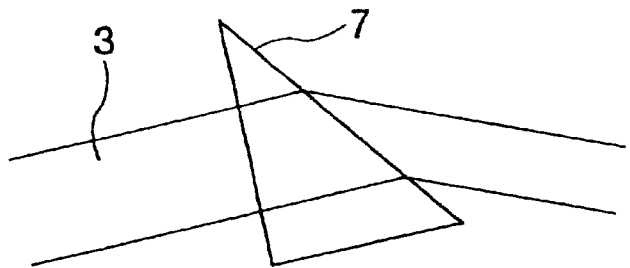
F I G. 1 0 CONVENTIONAL ART
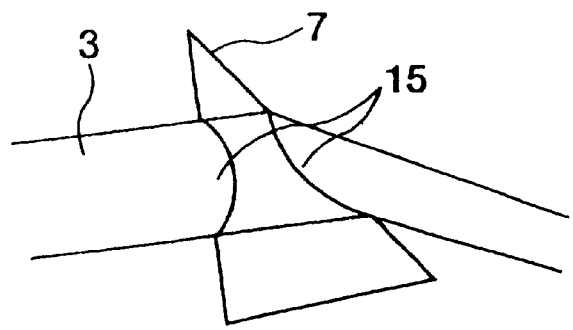

NARROW-BAND OSCILLATION EXCIMER LASER AND OPTICS THEREOF

TECHNICAL FIELD

The present invention relates to an excimer laser, and the invention particularly relates to a narrow-band oscillation excimer laser and the optics thereof, which are excellent in durability against light and have less deterioration in light quality.

BACKGROUND ART

An excimer laser has been conventionally developed for commercial use as a light source of a reducing projection and exposure device (hereinafter referred to as a stepper) for a semiconductor manufacturing apparatus. This is because an excimer laser enables extremely precise work, since the wavelength of the excimer laser is in an ultraviolet region and is short, thereby permitting the concentration of the light into a smaller area by means of an external optical element, such as a lens, when conducting the work.

Light oscillating from the excimer laser has various wavelength components, and the central wavelength varies. As a result, if the light is in the as-is status, an aberration will occur when the light passes through an external optical element, such as a lens, thereby reducing the accuracy of the work. For this reason, there is a widely used art of making a narrow band, in which an excimer laser is equipped with a wavelength selecting element, such as a grating, to narrow the spectral width of the laser oscillation wavelength, which is called a line width, and to stabilize the central wavelength as a central value of the oscillation wavelength.

FIG. 8 shows an example of a prior art disclosed in Japanese Laid-open Patent No. 3-214680. Laser gas is sealed in a chamber 1, and energy is supplied as a result of an electrical discharge in a discharge electrode 2 portion, whereby the laser beam 3 oscillates. The oscillating laser beam 3 exits through a rear window 5, the beam size thereof is widened while passing through a first prism 7 and a second prism 8, and then the laser beam 3 enters a grating 10. In the grating 10, an angle relative to the light path of the laser beam 3 is controlled by an actuator (not illustrated), and only by oscillating a predetermined wavelength, which is selected, the aforesaid narrow band is achieved. Here, a group of optical components, which are the first prism 7, the second prism 8, and the grating 10, is collectively called the narrow-band optics 12. The laser beam 3, with the wavelength being controlled by the narrow-band optics 12, passes through a front window 13 and a front mirror 14, which is a partial reflecting mirror, and part of the laser beam 3 exits to the right, as shown in FIG. 8.

Synthetic fused silica ($SiO_2$) is generally used as the material of the optical components for the aforesaid excimer laser, as disclosed in Japanese Laid-open Patent No. 3-214680. This is because synthetic fused silica has a lower absorption rate with respect to ultraviolet light exiting from the excimer laser, and is easily processed. The kinds of materials, having high transmittivity for the ultraviolet light of 248 nm, which is the wavelength of a KrF excimer laser, or of 193 nm, which is the wavelength of an ArF excimer laser, are limited; and fluorides such as $CaF_2$, $MgF_2$, and LiF, are presently known as suitable materials instead of the synthetic fused silica.

However, at the present time, the art of manufacturing and processing these fluorides is not as mature, compared with that of synthetic fused silica. For this reason, it is difficult to produce optical material which is equivalent to synthetic fused silica in size, quantity, and optical properties and which can be manufactured. Therefore, in many cases, synthetic fused silica is used as the optical material. Especially in the KrF excimer laser, which has a comparatively long oscillation wavelength, the optical components are less deteriorated; therefore, optical components made of synthetic fused silica can endure for extended periods of use. Consequently, synthetic fused silica is generally used for the optical components for the KrF excimer laser.

However, there are the following disadvantages in using synthetic fused silica as the material for the optics for an excimer laser.

In order to manufacture semiconductors efficiently in large quantities, it is necessary to improve the manufacturing performance of a stepper; and there has been a demand to increase the power of a laser by increasing the laser oscillation pulse numbers per unit time (also called the repetition frequency). However, the energy density is high in the resonator of the laser, and moreover, a laser beam reciprocates in the resonator and passes through the optical components many times. For this reason, as the power of a laser becomes higher, the optical components, made of synthetic fused silica and used for the KrF excimer laser, are deteriorated as a result of even a little distortion or unevenness inside the material, which results in a disadvantage. Even a little deterioration of the optical components exerts a great influence on the quality of the oscillating laser beam, and makes it difficult to use the laser as a light source of a stepper.

Thus, the optical components of synthetic fused silica are insufficient in durability when the power of an excimer laser is increased, and a highly accurate control of the wavelength of an excimer laser is difficult when these optical components are used.

A situation in which the optical components are deteriorated by oscillating laser beams will be explained with reference to FIGS. 9 and 10. FIG. 9 shows a normal condition of the first prism 7 and the laser beam 3 passing through it. As the repetition frequency is increased, the inner portion of the prism 7 is distorted by the energy of the laser beam 3. When the distortion becomes greater, the surface of the prism 7 is shrunk; and as shown in FIG. 10, a distortion 15 occurs on the surface. Thus, the beam size of the laser beam 3 and the sectional shape of the beam are varied, the wave front of the laser beam 3 is disturbed, and the wavelength and the polarized light condition are not normal. This occurrence results in a disadvantage. As a result of the distortion 15, it may happen that a nonreflective coating, applied on the surface of the prism 7, comes off, and the laser beam 3 concentrates thereon, thereby breaking the prism 7.

FIGS. 11 and 12 show the distribution of narrow-band laser oscillation wavelengths before and after the deterioration of an optical component. When the optical component is deteriorated, as shown in FIG. 12, the central wavelength λc varies between λc and λc', for example, or the line width Δλ is increased. Therefore, such a laser is difficult to use as a light source for a stepper.

SUMMARY OF THE INVENTION

The present invention is made to eliminate the disadvantages of the aforesaid prior art, and its object is to provide a narrow-band oscillation excimer laser and the optics thereof, which are excellent in durability against ultraviolet light, which maintain good light quality, and which are suitable for wavelength control.

An optic for a narrow-band oscillation excimer laser according to the present invention is a component made of fluoride, and is characterized by a cleavage plane of the fluoride component being almost parallel with at least one of (a) an incidence side plane, for a laser beam entering the fluoride component, and (b) an exit side plane, for the laser beam exiting from the fluoride component.

According to the above configuration, a fluoride is used as the material of the optical component, and the optical component is configured so that the cleavage plane of the fluoride crystal is almost parallel with the incidence side plane or the exit side plane of the optical component. As a result, variations in the polarized light condition, the unevenness in the wave front, and the like are reduced, and an excellent light quality can be obtained when the laser beam passes through the cleavage plane.

Further, the fluoride component can include a visible mark indicating the direction of the cleavage plane. According to this configuration, when the optical component is attached in the excimer laser, the direction is easily determined; and therefore, the optical component is prevented from being attached in an improper direction.

Furthermore, the fluoride component can be a narrow-band component for making a laser beam have narrow-band oscillation wavelengths.

According to the latter configuration, the fluoride components are used for making the laser beam have a narrow band. In order to make a narrow band accurately, the narrow-band components need to be made with excellent precision. In other words, even a slight deterioration of an optical component exerts a bad influence on the wavelength control of a laser. In the present invention, the narrow-band optics are made of fluoride; therefore the deterioration in the optical components can be reduced. In addition, a laser beam can be obtained with the central wavelength being stable, with the line width being narrower, and with a higher light quality.

A narrow-band oscillation excimer laser according to the present invention is characterized by including an optical component made of fluoride, and by the optical component being placed so that a cleavage plane of the optical component is at least substantially perpendicular to a light path of a laser beam passing through the inside of the optical component.

According to this configuration, the optical component is placed so that the cleavage surface is almost perpendicular to the light path; therefore, the effect caused by any unevenness in the refraction index, the optical distortion, and the like within the optical components, can be reduced to a minimum. As a result, the variations in the polarized light condition, the unevenness in the wave front, and the like, which occur when the laser beam passes through the optical component, can be reduced, and an excellent light quality can be obtained. In each component, the unevenness in the refractive index and the like are reduced to a minimum by using a specified crystal direction relative to the cleavage plane of the material. Thereby, the individual differences of the optical components are decreased, and a stable optical performance can be obtained. As a result, the light quality of the excimer laser can be stabilized.

BRIEF DESCRIPTION OF THE DRAWINGS

FIG. 8 is a block diagram of a narrow-band oscillation excimer laser of the prior art;

FIG. 9 is an explanatory diagram of a normal condition of an ordinary prism and a light path;

FIG. 10 is an explanatory diagram of a deteriorated condition of the prism in FIG. 9;

BEST MODE FOR CARRYING OUT THE INVENTION

With reference to the drawings, preferred embodiments according to the present invention will be explained.

Figure 1:
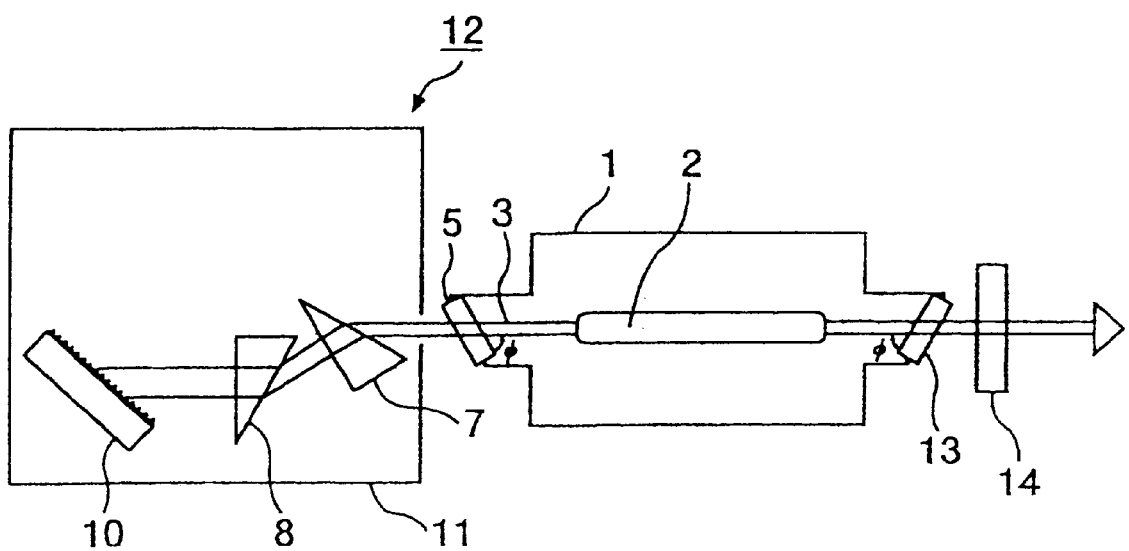
FIG. 1 is a block diagram of a narrow-band oscillation excimer laser according to a first embodiment of the present invention.

FIG. 1 is a first embodiment of the present invention, and shows a configuration of a narrow-band oscillation excimer laser device. The narrow band optics 12, comprises a first prism 7, a second prism 8, and a grating 10, which are housed in a narrow band module 11. A front window 13 and a rear window 5 form an ordinary Brewster angle relative to a laser beam 3 in order to reduce energy loss. In the present embodiment, the optical components, such as the first prism 7, the second prism 8, and a front mirror 14, are made of a fluoride optical material, such as $CaF_2$, instead of the conventional synthetic fused silica.

According to the above configuration, the fluoride optics are not deteriorated by ultraviolet light; therefore, the narrow-band wavelength of the excimer laser can be effectively made. Specifically, since the prisms 7 and 8 are required to have accurate shapes for making narrow-band wavelengths, the wavelength control becomes difficult if these components are deteriorated; therefore, a great effect is obtained by using fluoride as the material of the prisms 7 and 8. The front mirror 14 is easily deteriorated since light with higher intensity passes through it; therefore, a great effect is obtained by using fluoride as the material of the front mirror 14.

As described above, by using fluoride, such as $CaF_2$, and $MgF_2$, for the optical components for which synthetic fused silica has been conventionally used, the optical components are made resistant to deterioration by the laser beam 3. Thereby, a narrow-band wavelength beam is accurately achieved, and the reliability of the excimer laser is increased.

Figure 2:
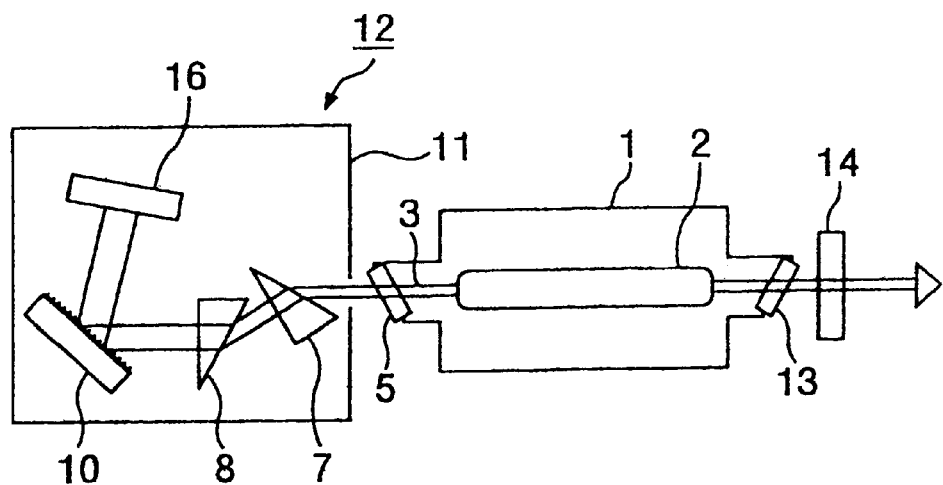
FIG. 2 is a block diagram of a narrow-band oscillation excimer laser according to a second embodiment of the present invention.

FIG. 2 is a second embodiment of the present invention, and shows the narrow-band optics 12 of an excimer laser, which is generally called a Littrow type. The laser beam 3, reflected upwardly in FIG. 2 by the grating 10, is totally reflected by a rear mirror 16, and reverses the original light path to exit from the front mirror 14. In the present embodiment, each of the rear mirror 16, the prism 7 the prism 8, and the front mirror 14, is made of fluoride, such as $MgF_2$.

The rear mirror 16 has been conventionally damaged greatly since it reflects the light outputted from the excimer laser, but the durability against the light of the narrow-band optics 12 is increased by making the rear mirror 16 of fluoride. Consequently, as in the first embodiment, a beam of narrow-band wavelength is accurately achieved, and the reliability of the excimer laser is increased.

In the configuration in FIGS. 1 and 2, it is possible that only the first prism 7, nearer to the chamber 1 of the excimer laser, is made of fluoride, while the second prism 8, away from the chamber 1, is made of synthetic fused silica. The prisms 7 and 8 are for magnifying the laser beam 3 exiting from the chamber 1, and the laser beam 3 passing through the first prism 7, nearer to the chamber 1, has a higher light density.

For this reason, the effect of making a prism of fluoride is greater for the first prism 7, which is easily deteriorated.

Figure 3:
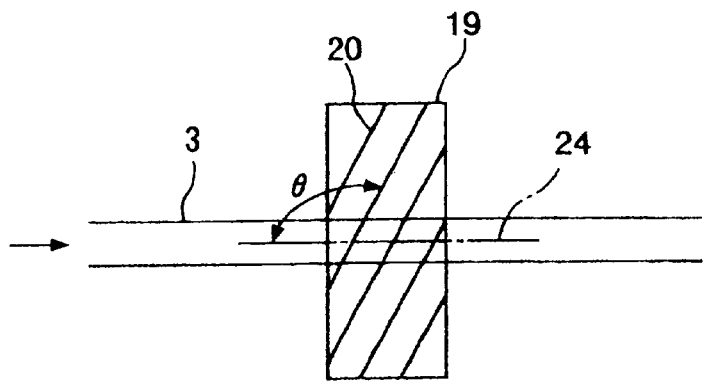
FIG. 3 is an explanatory diagram of a cleavage plane of a fluoride optical component according to a third embodiment of the present invention.

Next, with reference to FIGS. 3 to 6, a third embodiment of the present invention will be explained. As is shown in FIG. 3, a fluoride optical component 19 has a cleavage plane 20 in accordance with the crystal structure of the fluoride. As an example of the cleavage plane 20, the (111) plane of the crystal can be cited. When the laser beam 3 passes through the optical component 19, if an angle θ formed by the cleavage plane 20 relative to an optical axis 24 of the laser beam 3 is an angle other than "an at least approximately right angle", the wave front is disturbed, the polarized light condition or the wavelength is varied, or part of the beam is absorbed and the output is reduced. The phrase "an at least approximately right angle" includes an angle which is precisely 90° as well as angles which are at least substantially, but not precisely, 90°.

Figure 4:
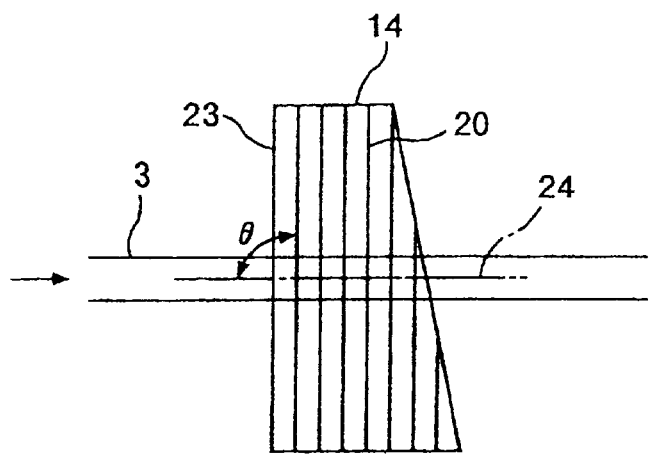
FIG. 4 is an explanatory diagram of a cleavage plane of a fluoride front mirror of the third embodiment.

Thus, in the present embodiment, the optical component 19 is made and placed in the light path so that the angle θ, formed by the cleavage surface 20 relative to the optical axis 24, becomes an at least approximately right angle. The front mirror 14 is shown in FIG. 4 as an example of the fluoride optical component 19 according to the present embodiment. In the front mirror 14 illustrated in FIG. 4, an incidence side plane 23 and the opposite side exit plane are not parallel with each other as in an ordinary front mirror, in order to avoid unnecessary oscillation caused by the reflection between the front surface and the back surface. Further, the front mirror 14 is made so that the cleavage plane 20 is at least substantially parallel with the incidence side plane 23 of the laser beam 3. The phrase "at least substantially parallel" includes precisely parallel as well as substantially, but not precisely, parallel. The front mirror 14 is positioned in the excimer laser so that the incidence side plane 23 is directed to (faces) the chamber 1 side (see FIG. 1) and the cleavage plane 20 is at least substantially perpendicular (specifically, the angle θ is an at least approximately right angle) to the optical axis 24 of the laser beam 3. The phrase "at least substantially perpendicular" includes precisely perpendicular as well as substantially, but not precisely, perpendicular. It should be noted that in the front mirror 14, the incidence side plane 23 and the opposite side exit plane can be made parallel with each other, and any unnecessary oscillation can be prevented by applying a nonreflective coating on one of these planes.

Figure 5:
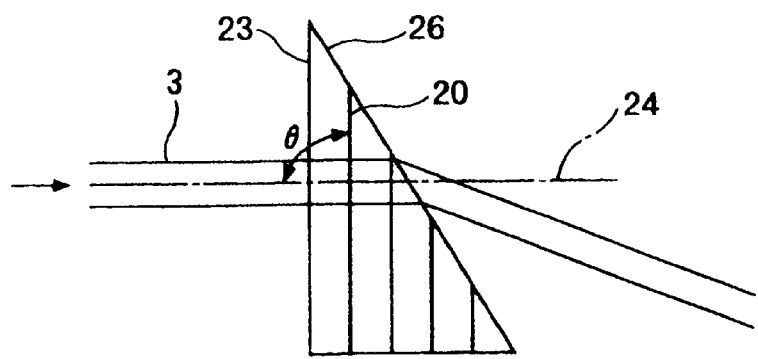
FIG. 5 is an explanatory diagram of a cleavage plane of a fluoride prism of the third embodiment.

As another example of the optical component 19 according to the present embodiment, a fluoride prism 26 is shown in FIG. 5. The prism 26 is made so that the cleavage plane 20 is at least substantially parallel with the incidence side plane 23 for the laser beam 3, and is positioned in the excimer laser so that the cleavage plane 20 is at least substantially perpendicular (specifically, the angle θ is an at least approximately right angle) to the optical axis 24 of the laser beam 3 passing through the inner portion of the prism 26. The incidence side plane for the laser beam 3 can be made to be the right side plane, which is opposite to the incidence plane in FIG. 5. In this latter case, the plane 23 becomes the exit side plane. Specifically, explaining with use of FIG. 5, the prism 26 can be placed so that the cleavage plane 20 will be at least substantially parallel with the exit side plane 23 for the laser beam 3 and the cleavage plane 20 will be at least substantially perpendicular to the optical axis 24 of the laser beam 3 passing through the inside of the prism 26.

Figure 6:
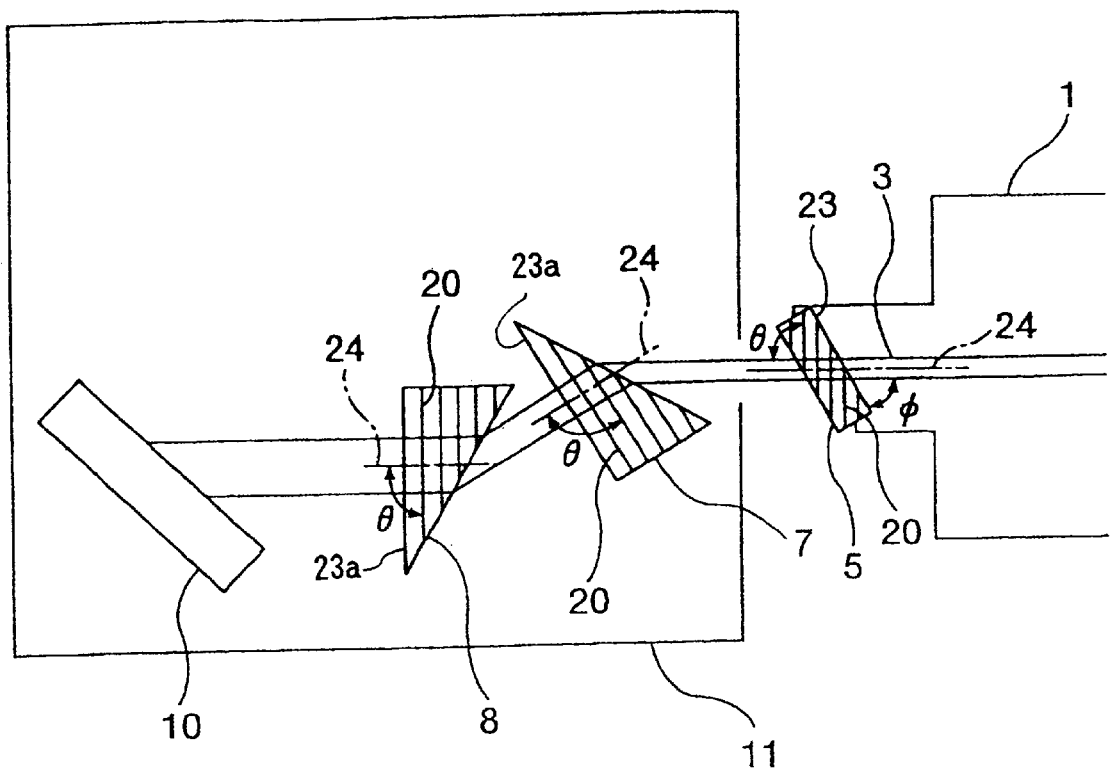
FIG. 6 is a block diagram of elements of a narrow-band oscillation excimer laser according to the third embodiment.

FIG. 6 shows the configuration of components of the excimer laser according to the third embodiment. In FIG. 6, the first prism 7, the second prism 8, and the rear window 5 are optical components made of fluoride, such as $CaF_2$ or the like. Each of the first prism 7 and the second prism 8 is made so that the cleavage plane 20 is at least substantially parallel with the respective exit side plane 23a for the laser beam 3, and the respective prism is placed so that its cleavage plane 20 is at least substantially perpendicular to the optical axis 24 of the laser beam 3 passing through the respective prism. The plane 23 is called the exit side plane of the laser beam 3, but it becomes the incidence side for the laser beam 3 reflected from the grating 10. Accordingly, the incidence side and the exit side can be expressed as one side and the opposite side, respectively.

As is also shown in FIG. 6, when the rear window 5 forms a Brewster angle φ relative to the laser beam 3, the rear window 5 is made so that the cleavage plane 20 is at least substantially perpendicular to the optical axis 24 while the rear window 5 is inclined at the Brewster angle φ; and thereafter the rear window 5 is positioned in the excimer laser at a predetermined location in the light path. The same is true for the front window 13 (see FIG. 1). Further, although not shown in FIG. 6, a front mirror is placed so that its cleavage plane 20 is at least substantially perpendicular to the optical axis 24 of the laser beam 3 in the same manner as the front mirror 14 shown in FIG. 4.

Figure 7:
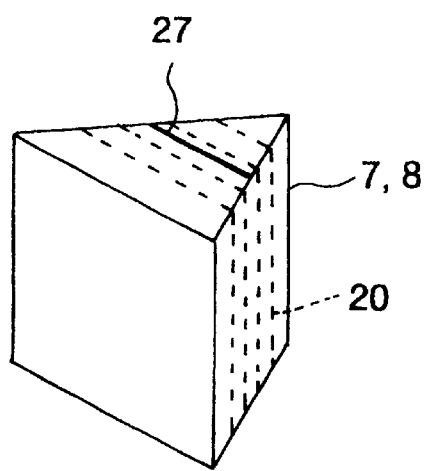
FIG. 7 is an explanatory diagram of a prism with a marking of a direction of a cleavage plane according to the third embodiment.
Figure 11:
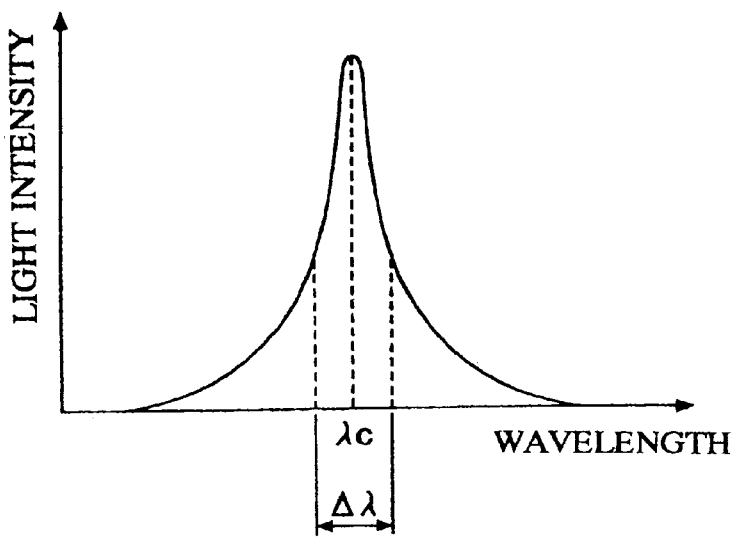
FIG. 11 is an explanatory diagram of laser beam wavelengths before the deterioration of an ordinary optical component.
Figure 12:
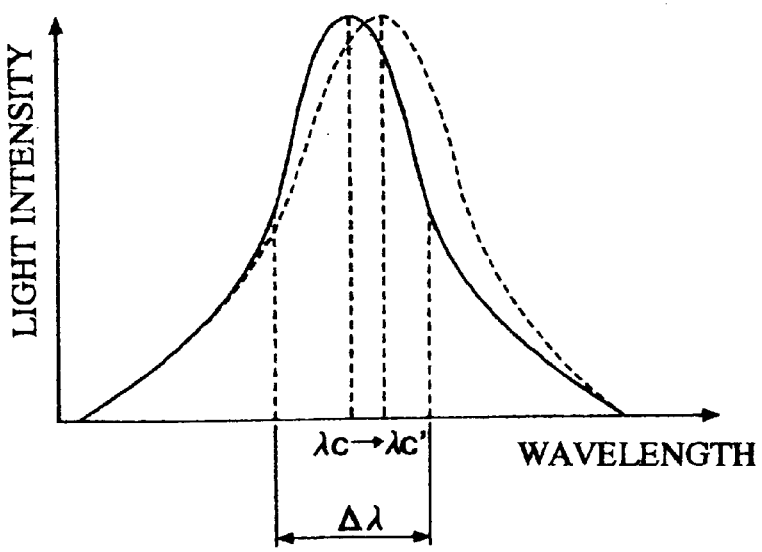
FIG. 12 is an explanatory diagram of the laser beam wavelengths after the deterioration of the optical component in FIG. 11.

In FIG. 7, a mark 27, indicating a direction of the cleavage plane 20 (shown by a dotted line), can be formed on the top surface of, for example, each of the prisms 7 and 8. Thus, the prisms 7 and 8 can be easily placed in the excimer laser so that the respective cleavage plane 20 is at least substantially perpendicular to the optical axis 24 (see FIG. 6) even if each of the prisms 7 and 8 is in an isosceles triangle form.

According to the third embodiment, the optical components for an excimer laser are made of fluoride, and are positioned in the excimer laser so that the respective cleavage plane 20 is at least substantially perpendicular to the optical axis 24. Thereby, a laser beam 3 with excellent light quality can be obtained without varying the wavelength and the polarized light condition when the laser beam 3 passes through the optical components, even with a higher output of the excimer laser.

As explained thus far, a fluoride, such as $CaF_2$ or $MgF_2$, is used for the optical components for the excimer laser of the present invention instead of the conventional synthetic fused silica, and the optical components are positioned in the excimer laser so that the cleavage plane of the respective fluoride crystal is at least substantially perpendicular to the optical axis of the laser. Thereby, the optical components are resistant to deterioration by the laser beam 3, and a beam having a narrow-band wavelength can be accurately achieved, so that the reliability of the excimer laser can be increased. In addition, variations in the polarized light condition, unevenness of the wave front, or the like of the excimer laser beam 3, which occur when the excimer laser beam 3 passes through the optical components, can be reduced, and an excellent light quality can be obtained.

What is claimed is:

1. An optic, which is suitable for use with a narrow-band oscillation excimer laser, said optic comprising a fluoride component made of fluoride, said fluoride component having an incidence side plane for a laser beam to enter said fluoride component, said fluoride component having an exit side plane for a laser beam to exit from said fluoride component, and said fluoride component having a cleavage plane which is at least substantially parallel with at least one of said incidence side plane and said exit side plane.

2. An optic in accordance with claim 1, wherein said fluoride component is a narrow-band component for making a laser beam have narrow-band oscillation wavelengths.

3. An optic in accordance with claim 1, wherein said fluoride component includes a visible mark indicating a direction of said cleavage plane.

4. An optic in accordance with claim 3, wherein said fluoride component is a narrow-band component for making a laser beam have narrow-band oscillation wavelengths.

5. An optic in accordance with claim 1, wherein said cleavage plane is at least substantially parallel with said incidence side plane.

6. An optic in accordance with claim 1, wherein said cleavage plane is at least substantially parallel with said exit side plane.

7. An optic in accordance with claim 1, wherein said cleavage plane is at least substantially parallel with said incidence side plane and said exit side plane.

8. An optic in accordance with claim 1, wherein said optic is a mirror.

9. An optic in accordance with claim 1, wherein said optic is a prism.

10. A narrow-band oscillation excimer laser, comprising:
a source of a laser beam; and
an optical component, said optical component comprising a fluoride component made of fluoride, wherein said fluoride component is positioned in said narrow-band oscillation excimer laser so that a cleavage plane of said optical fluoride component is at least substantially perpendicular to a light path of the laser beam passing through an inside of said fluoride component.

11. A narrow-band oscillation excimer laser in accordance with claim 10, wherein said fluoride component has an incidence side plane for the laser beam to enter said fluoride component, wherein said fluoride component has an exit side plane for the laser beam to exit from said fluoride component, and wherein said cleavage plane is at least substantially parallel with at least one of said incidence side plane and said exit side plane.

12. A narrow-band oscillation excimer laser in accordance with claim 11, wherein said cleavage plane is at least substantially parallel with said incidence side plane.

13. A narrow-band oscillation excimer laser in accordance with claim 11, wherein said cleavage plane is at least substantially parallel with said exit side plane.

14. A narrow-band oscillation excimer laser in accordance with claim 11, wherein said cleavage plane is at least substantially parallel with said incidence side plane and said exit side plane.

15. A narrow-band oscillation excimer laser in accordance with claim 11, wherein said fluoride component is a narrow-band component for making the laser beam have narrow-band oscillation wavelengths.

16. A narrow-band oscillation excimer laser in accordance with claim 10, wherein said fluoride component includes a visible mark indicating a direction of said cleavage plane.

17. A narrow-band oscillation excimer laser in accordance with claim 16, wherein said fluoride component is a narrow-band component for making the laser beam have narrow-band oscillation wavelengths.

18. A narrow-band oscillation excimer laser in accordance with claim 17, wherein said optical component is a prism.

19. A narrow-band oscillation excimer laser in accordance with claim 10, wherein said optical component is a mirror.

20. A narrow-band oscillation excimer laser in accordance with claim 10, wherein said optical component is a prism.

* * * * *